US011460363B2

(12) United States Patent
Kusanale et al.

(10) Patent No.: US 11,460,363 B2
(45) Date of Patent: Oct. 4, 2022

(54) PRESSURE SENSORS AND METHODS OF MANUFACTURING A PRESSURE SENSOR

(71) Applicant: HONEYWELL INTERNATIONAL INC., Morris Plains, NJ (US)

(72) Inventors: Vishal Shalitkumar Kusanale, Morris Plains, NJ (US); Todd Eckhardt, Morris Plains, NJ (US); Palani Thanigachalam, Morris Plains, NJ (US); Vignesh Murugesan, Morris Plains, NJ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 265 days.

(21) Appl. No.: 16/824,765

(22) Filed: Mar. 20, 2020

(65) Prior Publication Data

US 2020/0326252 A1 Oct. 15, 2020

(30) Foreign Application Priority Data

Mar. 29, 2019 (IN) .............................. 201911012458

(51) Int. Cl.
G01L 7/08 (2006.01)
G01L 19/00 (2006.01)
G01L 19/14 (2006.01)

(52) U.S. Cl.
CPC .......... *G01L 7/082* (2013.01); *G01L 19/0061* (2013.01); *G01L 19/148* (2013.01)

(58) Field of Classification Search
None
See application file for complete search history.

(56) References Cited

U.S. PATENT DOCUMENTS 6,672,170 B1 * 1/2004 DiPaola ................ G01L 19/143
7,861,595 B2 1/2011 Brown et al.
(Continued)

FOREIGN PATENT DOCUMENTS

CN 105236343 B 7/2017
CN 210089911 U 2/2020
(Continued)

OTHER PUBLICATIONS

Office Action issued in Chinese Application No. 202010240016.5 dated Jun. 3, 2021, 17 pages.
(Continued)

*Primary Examiner* — Peter J Macchiarolo
*Assistant Examiner* — Jermaine L Jenkins
(74) *Attorney, Agent, or Firm* — Alston & Bird LLP

(57) ABSTRACT

A pressure sensor and method of manufacturing the like are provided for determining a pressure of a fluid. An example pressure sensor includes a pressure sensor housing sealably attached to a diaphragm at a first end. The header includes a lip configured to engageably fit with the second end of the pressure sensor housing to create a hermetically sealed component compartment. The header also includes header pin(s) configured to transmit electrical signals between an interior and an exterior of the hermetically sealed component compartment. A sensing element and a processor are disposed within the hermetically sealed component compartment and in communication with one another. The sensing element is mounted to the processor within the hermetically sealed compartment. The corresponding method of manufacture is also provided.

20 Claims, 15 Drawing Sheets

(56) References Cited

U.S. PATENT DOCUMENTS

| | | | |
|---|---|---|---|
| 2003/0150275 A1 | 8/2003 | Wagoner et al. | |
| 2004/0007073 A1* | 1/2004 | Weise | G01L 19/0084 |
| | | | 73/715 |
| 2013/0119492 A1 | 5/2013 | Feiertag et al. | |
| 2014/0033824 A1* | 2/2014 | Habibi | G01L 19/148 |
| | | | 73/754 |
| 2014/0090485 A1 | 4/2014 | Feyh et al. | |
| 2015/0247776 A1* | 9/2015 | Wagner | G01L 19/147 |
| | | | 73/431 |
| 2017/0038272 A1* | 2/2017 | Jacobs | G01L 19/148 |
| 2017/0234751 A1 | 8/2017 | Aoyama et al. | |
| 2019/0285496 A1* | 9/2019 | Takimoto | G01L 19/0069 |

FOREIGN PATENT DOCUMENTS

| | | |
|---|---|---|
| CN | 211877068 U | 11/2020 |
| EP | 0828147 A3 | 3/1998 |
| WO | 2019/020529 A1 | 1/2019 |

OTHER PUBLICATIONS

Communication Pursuant to Article 94(3) issued in European Application No. 20165406.8, dated Aug. 10, 2021, 4 pages.
Extended European Search Report for Patent Application No. 20165406.8 dated Aug. 27, 2020, 8 pages.
CN Office Action dated Jan. 19, 2022 for CN Application No. 202010240016.
English Translation of ON Office Action dated Jan. 19, 2022 for CN Application No. 202010240016.

\* cited by examiner

PRESSURE SENSORS AND METHODS OF MANUFACTURING A PRESSURE SENSOR

CROSS-REFERENCE TO RELATED APPLICATIONS

This specification is based upon and claims the benefit of priority from Indian patent application number IN 201911012458 filed on Mar. 29, 2019, the entire contents of which are incorporated herein by reference.

TECHNOLOGICAL FIELD

An example embodiment relates generally to pressure sensors and method of manufacturing the same and, more particularly, to pressure sensors and associated method of manufacturing for determining a pressure of a fluid with minimal media interference.

BACKGROUND

Pressure sensors are used in various harsh environments for a multitude of applications. Sensing dies used in many pressure sensors are susceptible to damage from media during these operations. Various current pressure sensors attempts at isolating sensing dies are largely ineffective due to the cost and/or size of solutions. Applicant has identified a number of deficiencies and problems associated with current sensors. For example, many lack protection from media during operation. Through applied effort, ingenuity, and innovation, many of these identified problems have been solved by the methods and apparatus of the present disclosure.

BRIEF SUMMARY

The following presents a simplified summary in order to provide a basic understanding of some aspects of the present disclosure. This summary is not an extensive overview and is intended to neither identify key or critical elements nor delineate the scope of such elements. Its purpose is to present some concepts of the described features in a simplified form as a prelude to the more detailed description that is presented later.

In an example embodiment, a pressure sensor is provided for determining the pressure of a fluid. The pressure sensor includes a pressure sensor housing sealably attached to a diaphragm at a first end of the pressure sensor housing. The pressure sensor also includes a header at a second end of the pressure sensor housing the header with a lip configured to engageably fit with the second end of the pressure sensor housing to create a hermetically sealed component compartment within the pressure sensor housing. The header includes three or more header pins configured to transmit an electrical signal between an interior and an exterior of the hermetically sealed component compartment. The pressure sensor further includes a processor disposed within the hermetically sealed component compartment and in electrical communication with the three or more header pins. The pressure sensor still further includes a sensing element coupled to the processor and disposed within the hermetically sealed component compartment. The sensing element is in electrical communication with the processor.

In some embodiments, the sensing element is in a stacked relationship with respect to the processor. In some embodiments, the hermetically sealed component compartment is filled with a liquid. In some embodiments, the diaphragm is configured to be in contact on a first surface with the hermetically sealed component compartment and on a second surface with the fluid to be measured. In some embodiments, the processor and the sensing element are attached using adhesive. In some embodiments, the processor is mounted directly to the header.

In some embodiments, the pressure sensor also includes a ceramic plate or printed circuit board ("PCB") directly mounted to the header. In some embodiments, the processor may be directly mounted to the ceramic plate or PCB. In some embodiments, the pressure sensor also includes a protective cap configured to be attached to the first end of the pressure sensor. In such an embodiment, the protective cap has at least one opening allowing the fluid to reach the diaphragm.

In some embodiments, the diaphragm is configured to deflect in one direction or another based on a difference in pressure between the hermetically sealed component compartment and the fluid to be measured. In such an embodiment, the deflection of the diaphragm alters an original pressure of the hermetically sealed component compartment, the sensing element is configured to measure the altered pressure of the hermetically sealed component compartment based on the deflection of the diaphragm, and the processor having computer coded instructions therein, with the computer instructions configured to, when executed, cause the pressure sensor to determine the pressure of the fluid based on the altered pressure measured by the sensing element and the original pressure.

In some embodiments, the sensing element and the processor have the same or substantially similar coefficient of thermal expansion. In some embodiments, the sensing element and the processor are at least partially made of silicone. In some embodiments, the processor is in communication with at least one of the three or more header pins. In some embodiments, the processor and the sensing element are completely enclosed in the hermetically sealed component compartment.

In another example embodiment, a pressure sensor for determining a pressure of a fluid is provided. The pressure sensor includes a housing having a diaphragm fixedly attached at a first end and having a second end. The second end has a mating surface that defines a recess and the housing defines a component compartment. The pressure sensor also includes a header having an exterior header member having a first cross-sectional diameter and interior header member having a second cross-sectional diameter. The interior header member is sized to be inserted into the recess and the exterior header member is sized to mate with the mating surface such that the header hermetically seals the component compartment. The pressure sensor further includes a sensing element disposed within the component compartment. The pressure sensor still further includes a processor disposed within the component compartment.

In some embodiments, the diaphragm is configured to be in contact on a first surface with the component compartment and on a second surface with the fluid to be measured. In some embodiments, the diaphragm and the header sealably enclose the component compartment to create a hermetically sealed component compartment. In some embodiments, the sensing element is mounted directly to the processor and the processor is mounted directly to the interior header member of the header.

In some embodiments, the processor and the sensing element are mounted directly to the interior header member of the header. In some embodiments, the pressure sensor also includes a ceramic plate or PCB directly mounted to the interior header member of the header. In some embodiments, the sensing element and the processor are mounted directly to the ceramic plate or PCB. In some embodiments, the sensing element is mounted directly to the processor and the processor is mounted directly to the ceramic plate or PCB.

In some embodiments, the pressure sensor also includes a protective cap configured to be attached to the first end of the pressure sensor. In such an embodiment, the protective cap has at least one opening allowing the fluid to reach the diaphragm. In some embodiments, the diaphragm is configured to deflect in one direction or another based on a difference in pressure between the hermetically sealed component compartment and the fluid to be measured. In such embodiments, the deflection of the diaphragm alters an original pressure of the sealed component compartment, the sensing element is configured to measure the altered pressure of the hermetically sealed component compartment based on the deflection of the diaphragm, and the processor having computer coded instructions therein, with the computer instructions configured to, when executed, cause the pressure sensor to determine the pressure of the fluid based on the altered pressure measured by the sensing element and the original pressure.

In some embodiments, the sensing element and the processor have the same or substantially similar coefficient of thermal expansion. In some embodiments, the sensing element and the processor are at least partially made of silicone. In some embodiments, the header includes three or more header pins configured to transmit an electrical signal between an interior and an exterior of the component compartment, and the processor is in communication with at least one of the three or more header pins. In some embodiments, the hermetically sealed component compartment is filled with a liquid. In some embodiments, the processor and the sensing element are completely enclosed in the hermetically sealed component compartment.

In another example embodiment, a method of manufacturing a pressure sensor for determining a pressure of a fluid is provided. The method includes disposing a sensing element on a header. The method also includes disposing a processor on the header. The method further includes attaching a diaphragm to a pressure sensor housing at a first end of the pressure sensor housing. The method still further includes engaging a lip of the header with a second end of the pressure sensor housing to form a hermetically sealed component compartment. The header includes three or more header pins configured to transmit an electrical signal between an interior and an exterior of the hermetically sealed component compartment.

In some embodiments, the diaphragm is configured to be in contact on a first surface with the hermetically sealed component compartment and on a second surface with the fluid to be measured.

In some embodiments, the method further includes filling the hermetically sealed component compartment with liquid. In some embodiments, the method further includes mounting the sensing element directly to the processor and mounting the processor directly to the header. In some embodiments, the method also includes mounting the processor and the sensing element directly to the header.

In some embodiments, the method also includes mounting a ceramic plate or PCB directly to the header. In some embodiments, the method also includes mounting the sensing element and the processor directly to the ceramic plate or PCB. In some embodiments, the method also includes mounting the sensing element is directly to the processor and mounting the processor directly to the ceramic plate or PCB. In some embodiments, the method also includes attaching a protective cap to the first end of the pressure sensor, wherein the protective cap has at least one opening allowing the fluid to reach the diaphragm.

In some embodiments, the diaphragm is configured to deflect in one direction or another based on a difference in pressure between the hermetically sealed component compartment and the fluid to be measured. In such an embodiment, the deflection of the diaphragm alters an original pressure of the hermetically sealed component compartment, the sensing element is configured to measure the altered pressure of the hermetically sealed component compartment based on the deflection of the diaphragm, and the processor having computer coded instructions therein, with the computer instructions configured to, when executed, cause the pressure sensor to determine the pressure of the fluid based on the altered pressure measured by the sensing element and the original pressure.

In some embodiments, the sensing element and the processor have the same or substantially similar coefficient of thermal expansion. In some embodiments, the sensing element and the processor are at least partially made of silicone. In some embodiments, the processor is in communication with at least one of the three or more header pins. In some embodiments, the processor and the sensing element are completely enclosed in the hermetically sealed component compartment.

In still another example embodiment, a method of determining the pressure of a fluid is provided. The method includes receiving an original pressure of a sealed component compartment from a sensing element, the method also includes receiving an altered pressure of the sealed component compartment from the sensing element. The method further includes determining, via a processor, the pressure of the fluid based on a comparison between the altered pressure and the original pressure. The processor and the sensing element are disposed in the sealed component compartment that is defined by a pressure sensor housing having a diaphragm at a first end of the pressure sensor housing and a header at a second end of the pressure sensor housing. The method still further includes transmitting a signal relating to the determined pressure of the fluid to at least one of three or more header pins.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Figure 1:
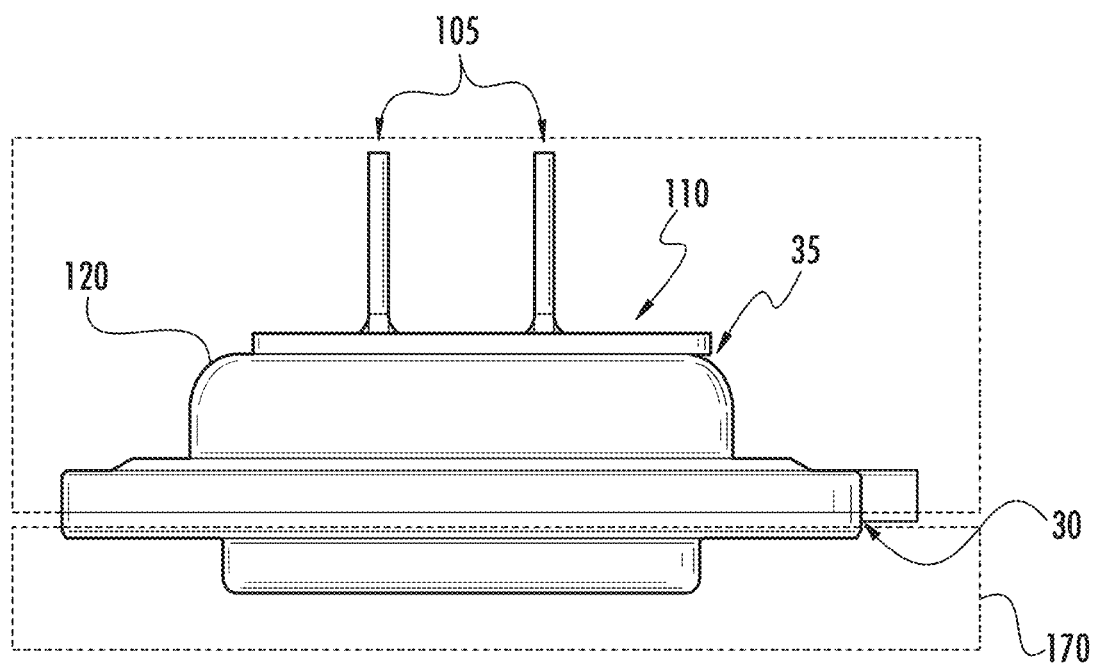
Figure 2:
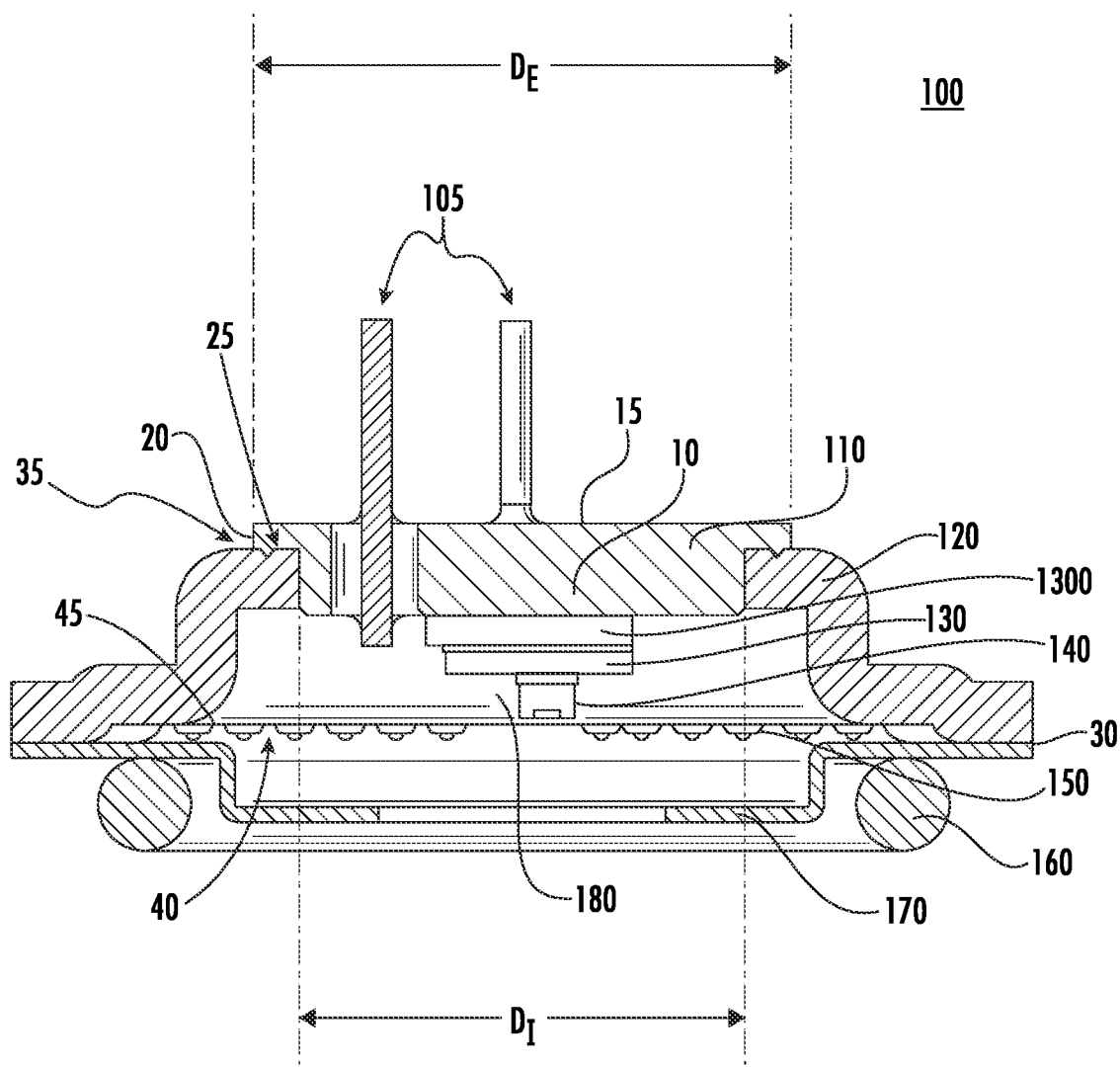
Figure 3:
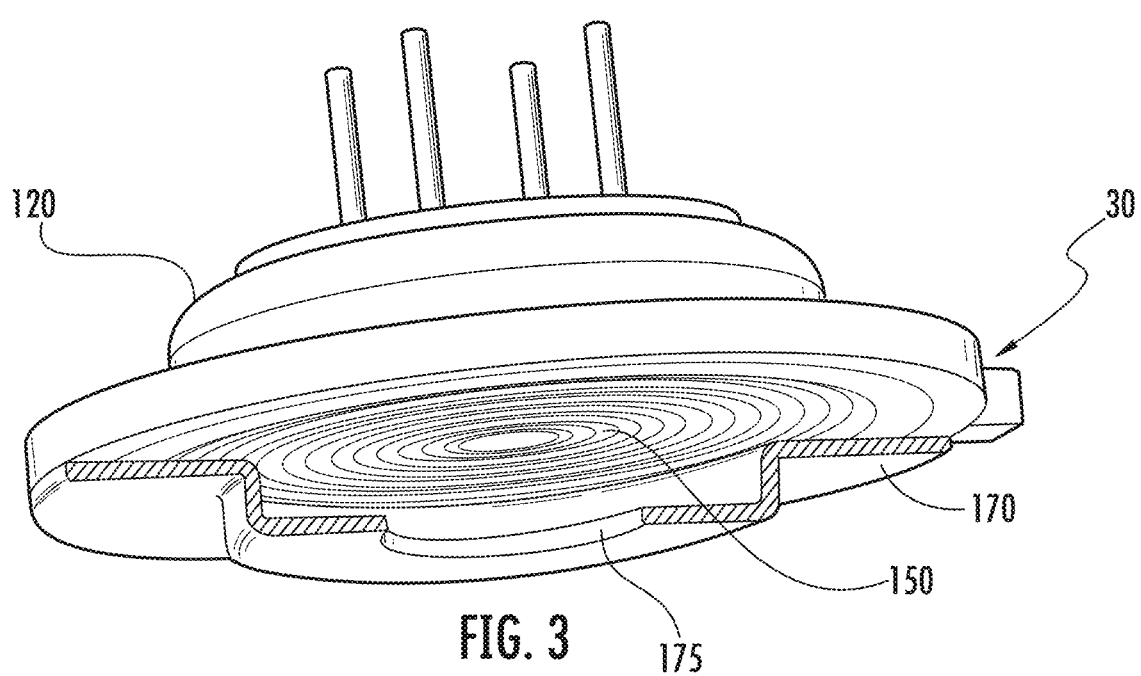
Figure 4A:
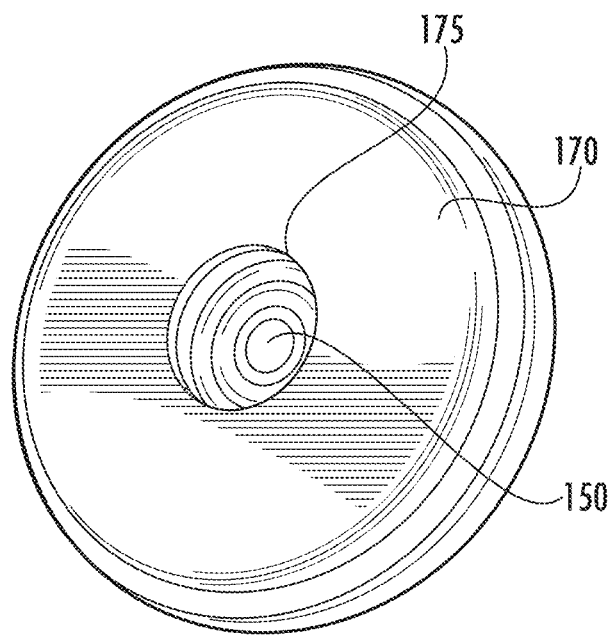
Figure 4B:
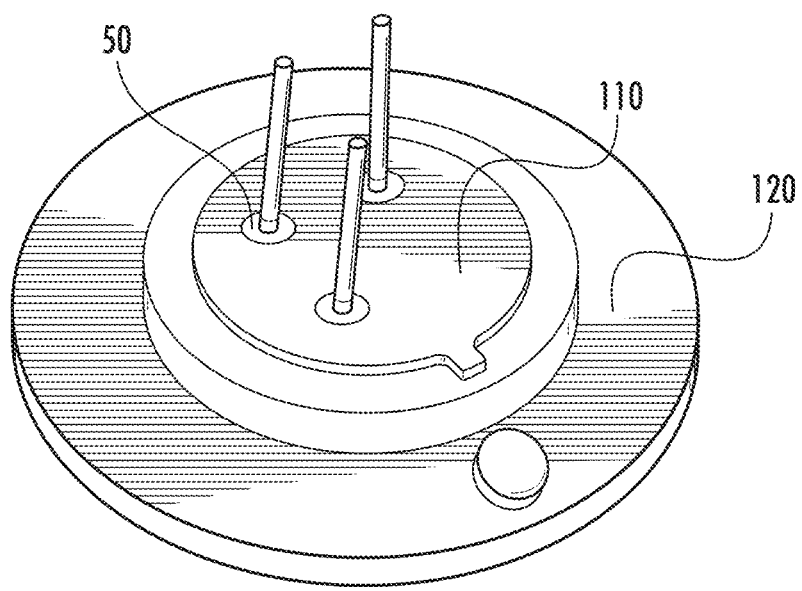
Figure 5:
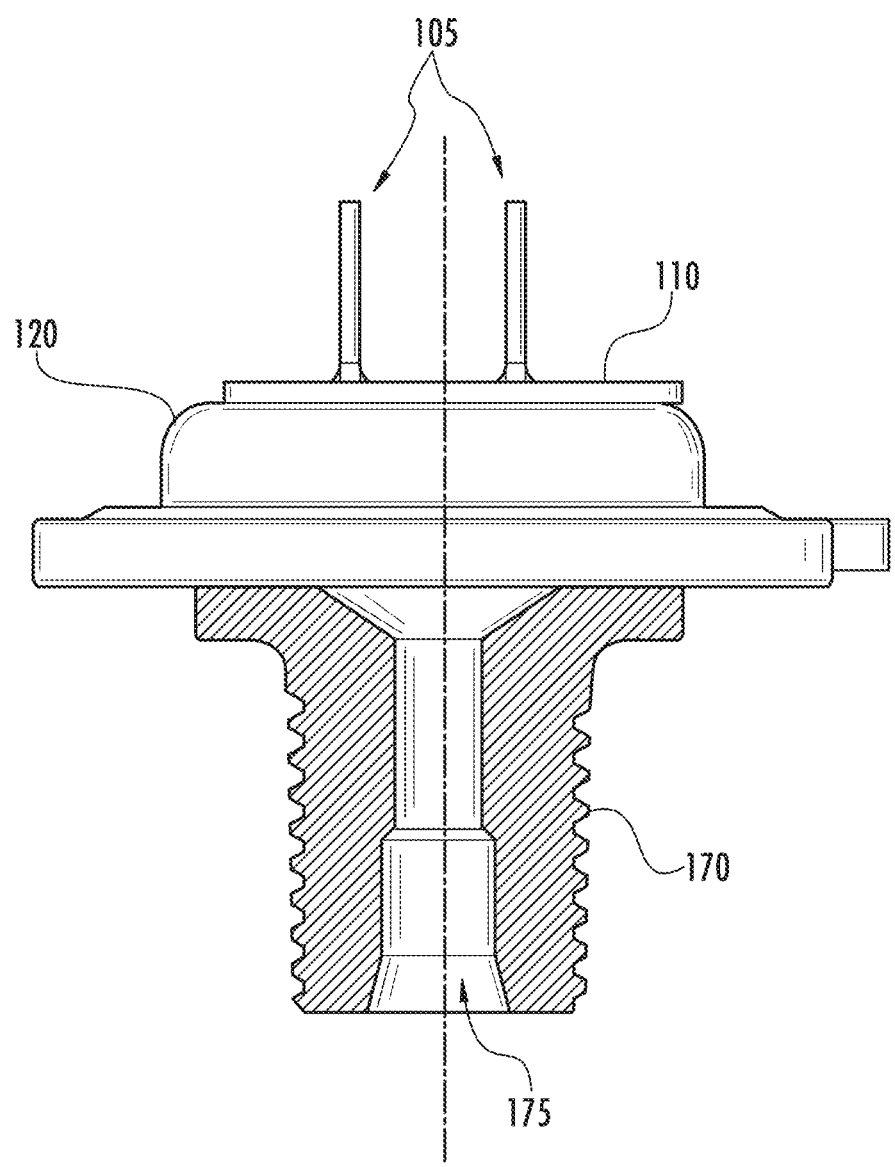
Figure 6A:
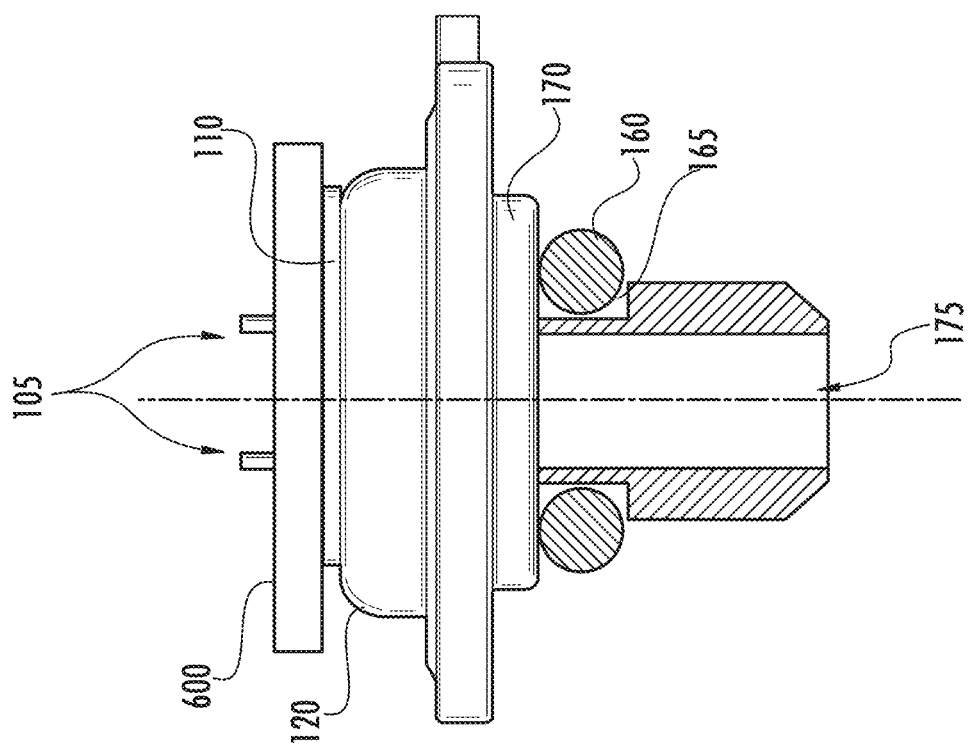
Figure 6B:
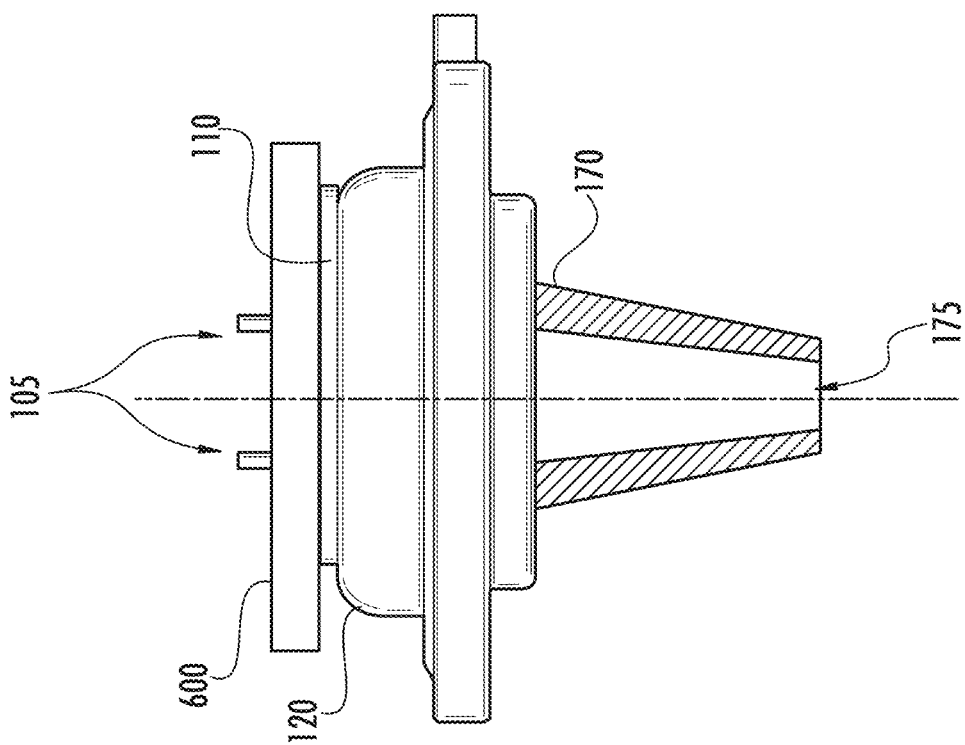
Figure 7A:
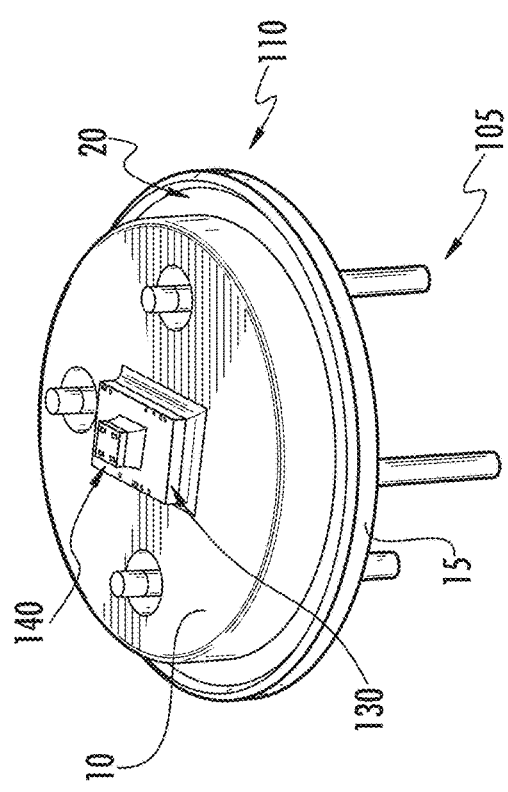
Figure 7B:
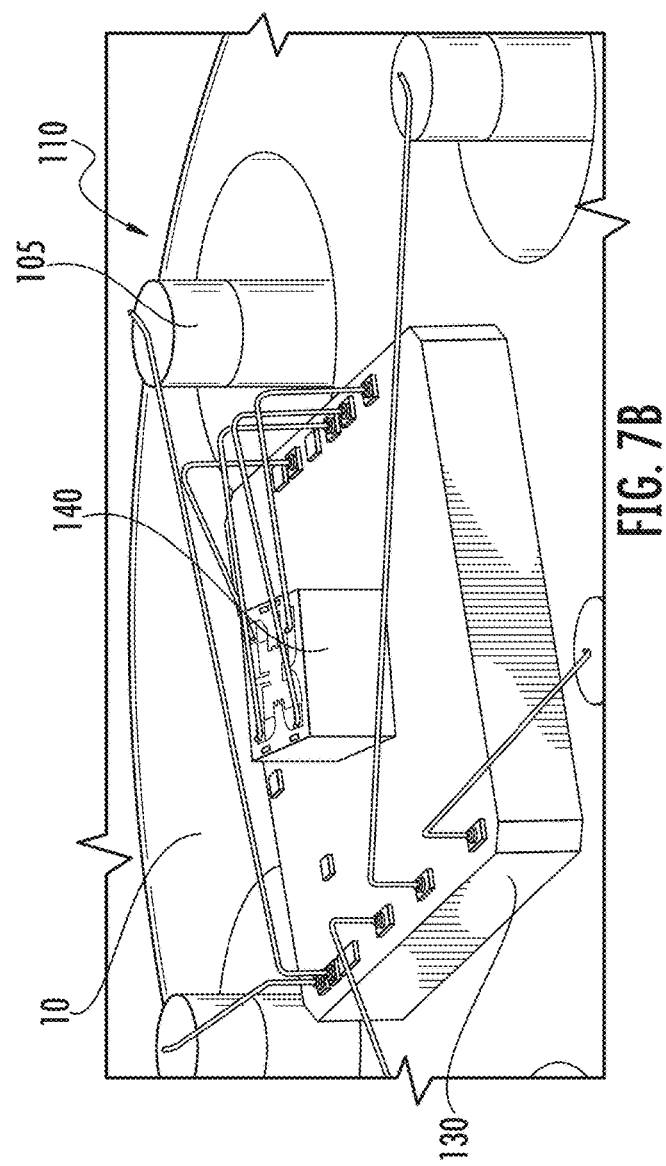
Figure 8:
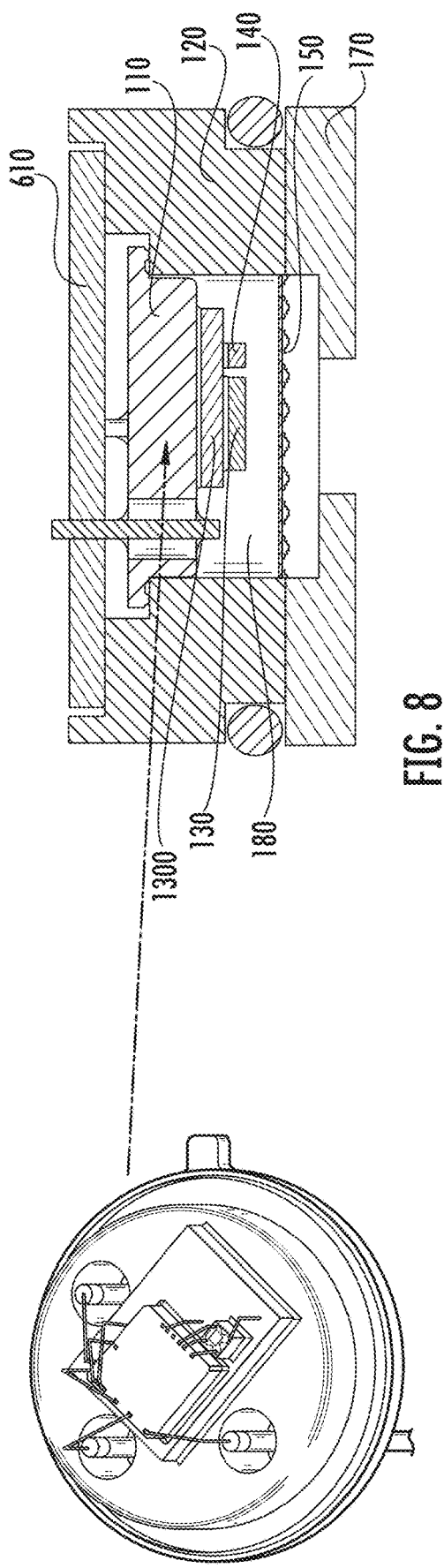
Figure 9:
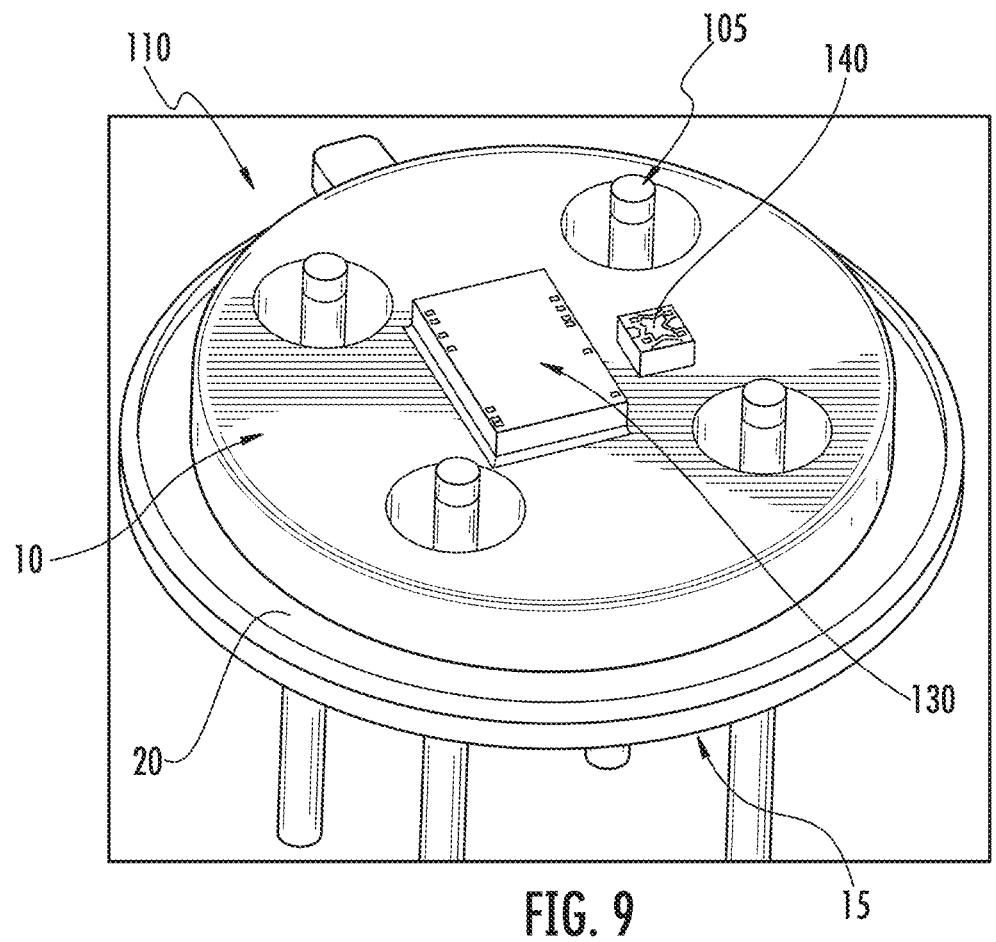
Figure 10:
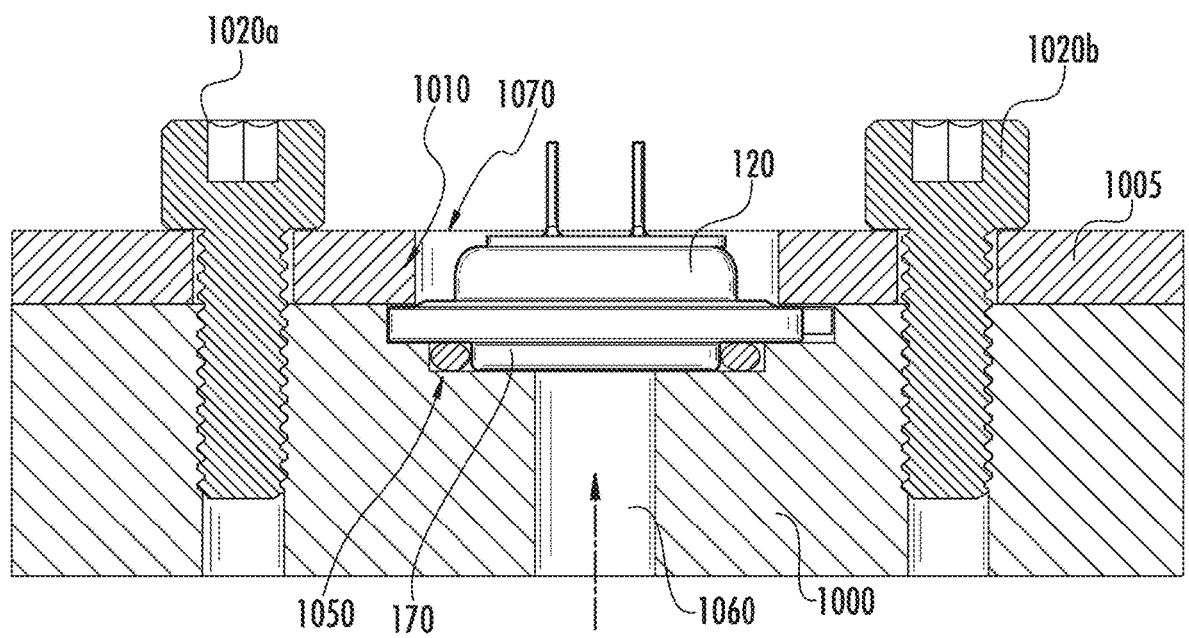
Figure 11:
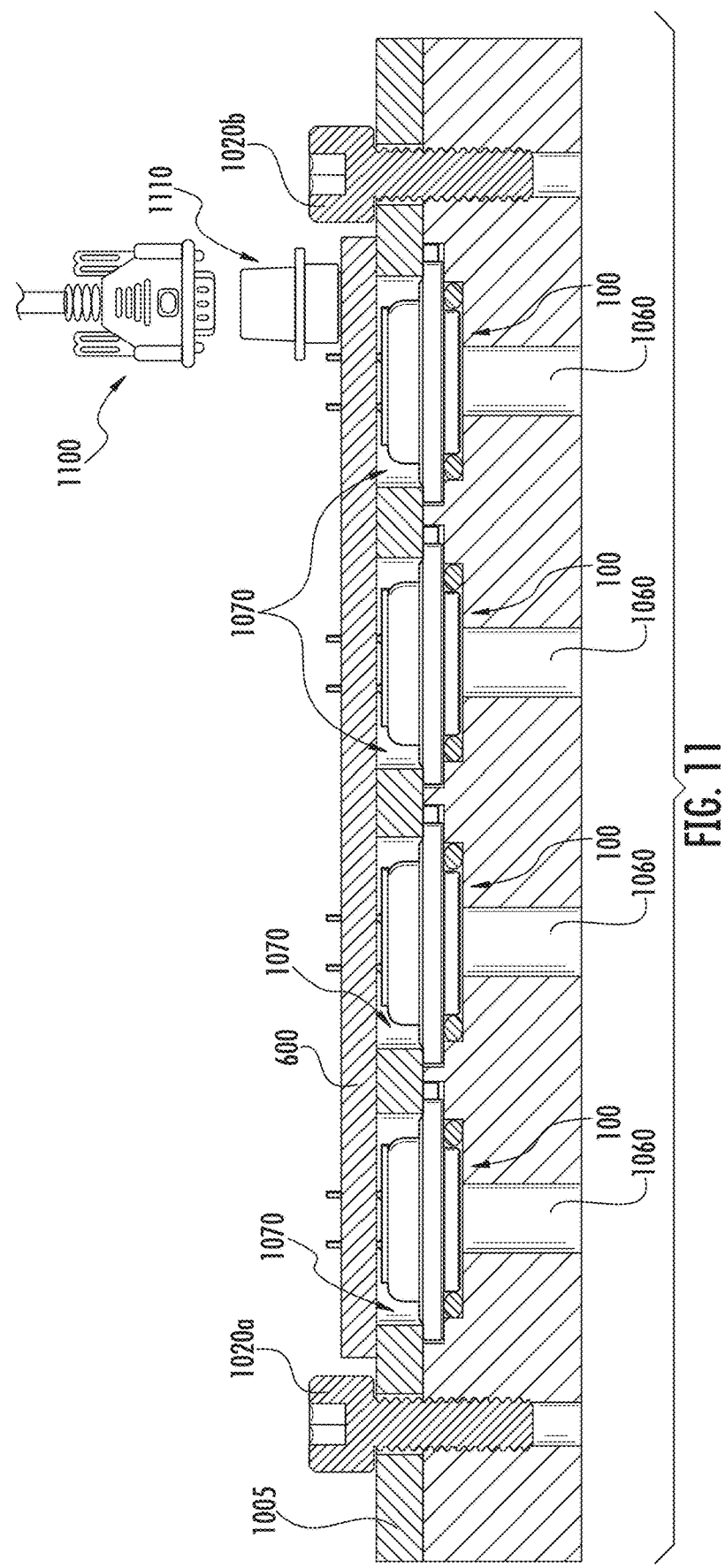
Figure 12A:
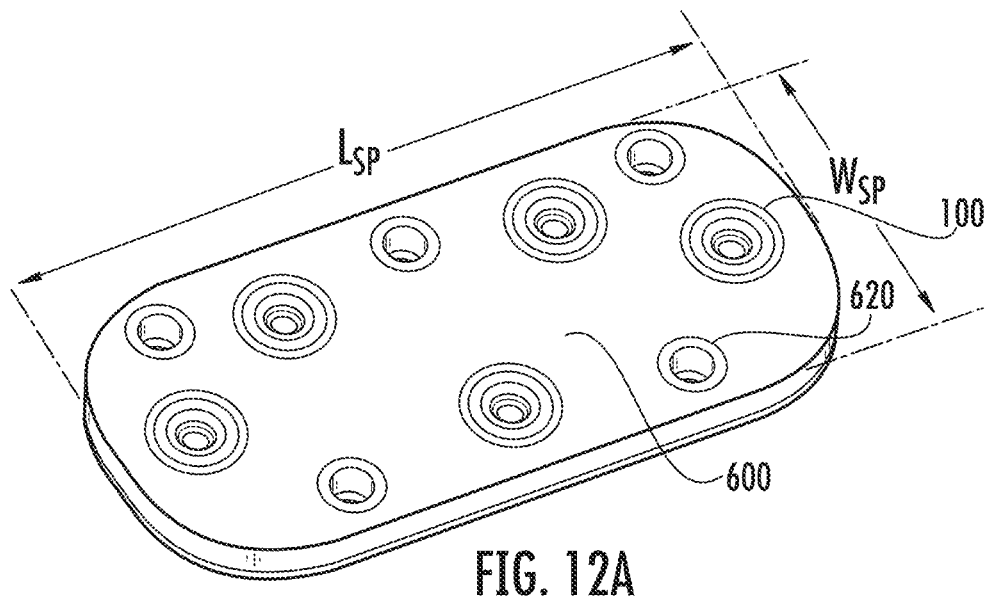
Figure 12B:
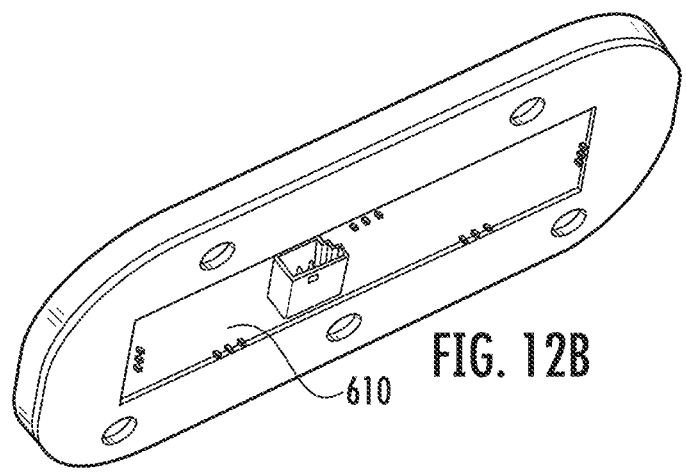
Figure 13:
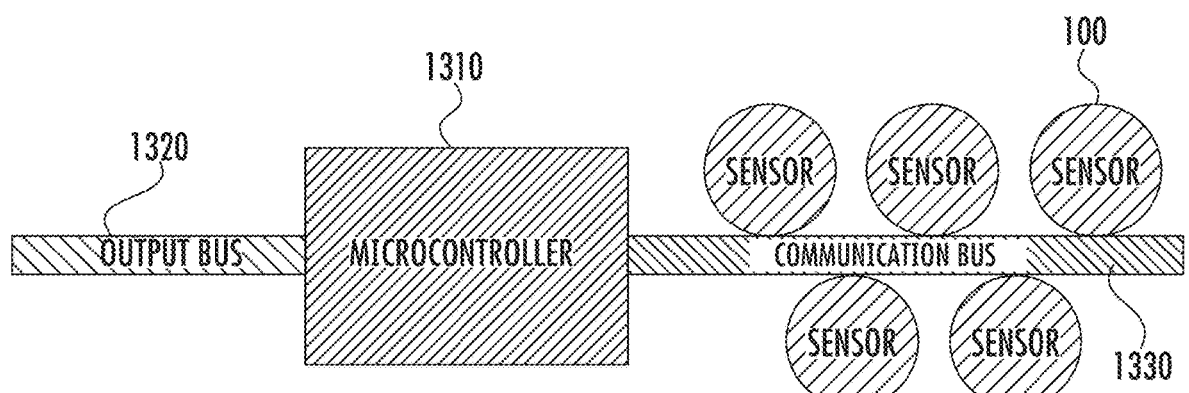
Figure 14:
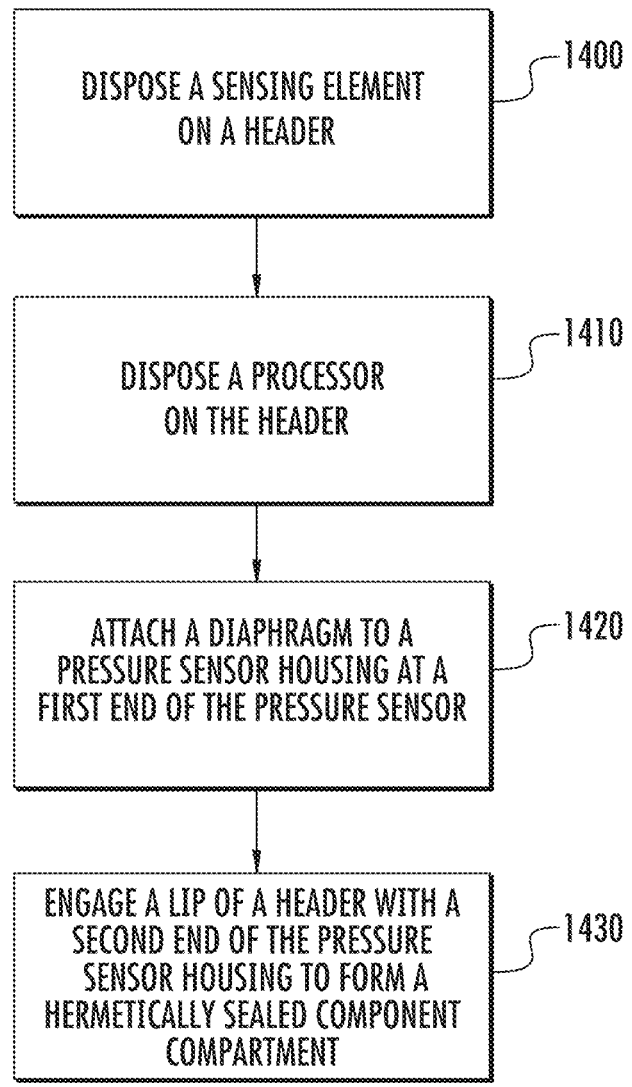
Figure 15:
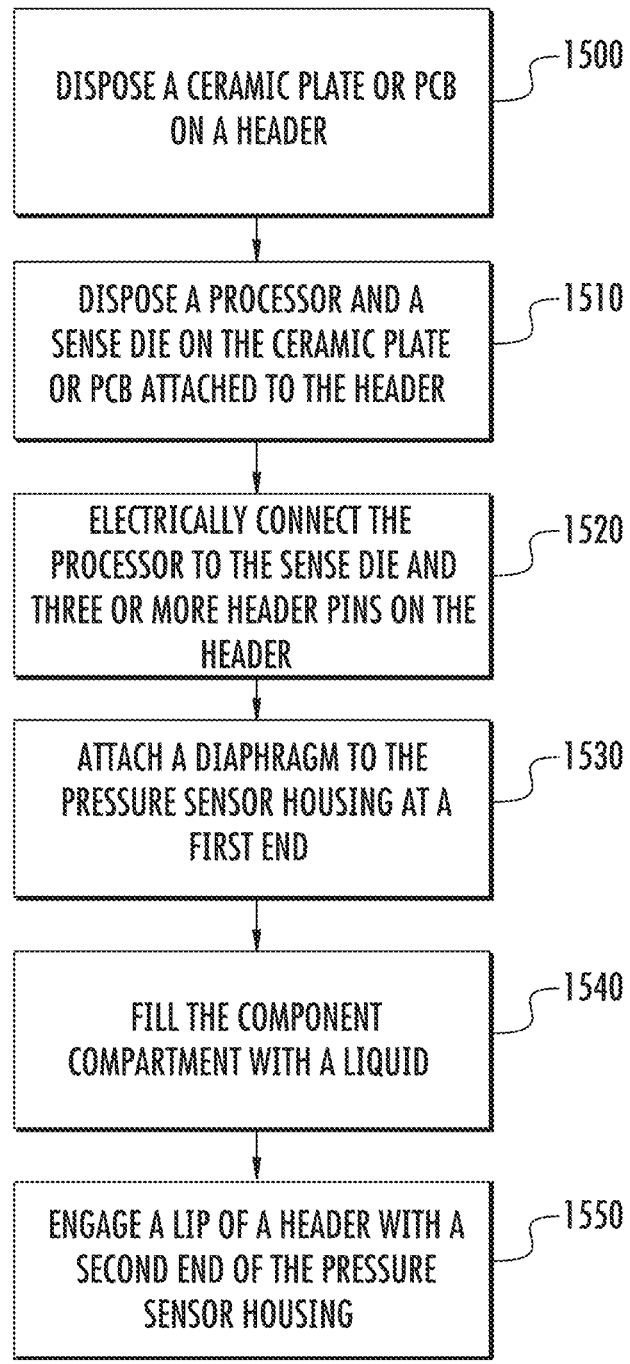

Having thus described certain example embodiments of the present disclosure in general terms, reference will hereinafter be made to the accompanying drawings, which are not necessarily drawn to scale, and wherein:

FIG. 1 is an exterior view of an example embodiment of a pressure sensor in accordance with the present disclosure;

FIG. 2 is a cross-sectional view of an example embodiment, such as the one shown in FIG. 1, in accordance with the present disclosure;

FIG. 3 is a partial cross-sectional view of the protective cap of an example embodiment of a pressure sensor in accordance with the present disclosure;

FIG. 4A is an exterior view of an example embodiment of a pressure sensor with a protective cap in accordance with an example embodiment;

FIG. 4B is another exterior view of an example embodiment of a pressure sensor in accordance with an example embodiment;

FIG. 5 is a partial cross-sectional view of an example embodiment of a pressure sensor with a threaded protective cap in accordance with an example embodiment;

FIG. 6A is another partial cross-sectional view of an example embodiment of a pressure sensor with a different variation of protective cap in accordance with an example embodiment;

FIG. 6B is yet another partial cross-sectional view of an example embodiment of a pressure sensor with a different variation of protective cap in accordance with an example embodiment;

FIG. 7A is a sensing element and processor mounted to a header in accordance with an example embodiment of the present disclosure;

FIG. 7B is a close up view of the example configuration of the header in FIG. 7A in accordance with an example embodiment of the present disclosure;

FIG. 8 is a cross-sectional view of an example embodiment of the present disclosure where a sensing element and processor are mounted to a ceramic plate, which is attached to the header in accordance with an example embodiment of the present disclosure;

FIG. 9 is another example embodiment of the mounting of the sensing element and processor to the header in accordance with an example embodiment of the present disclosure;

FIG. 10 is an example pressure sensor mounting configuration for an example embodiment of the present disclosure;

FIG. 11 is an example pressure sensor mounting configuration for a plurality of example embodiments of the present disclosure;

FIG. 12A is an example support plate used in connection with an example embodiment of the present disclosure;

FIG. 12B is another view of the support plate shown in FIG. 12A illustrating an example printed circuit board used in connection with an example embodiment of the present disclosure;

FIG. 13 is an example schematic of a system using a plurality of pressure sensors in accordance with the present disclosure;

FIG. 14 is a flowchart illustrating a method of manufacturing a pressure sensor in accordance with an example embodiment of the present disclosure; and FIG. 15 is a flowchart illustrating a method of manufacturing a pressure sensor in accordance with an example embodiment of the present disclosure.

DETAILED DESCRIPTION

Some embodiments will now be described more fully hereinafter with reference to the accompanying drawings, in which some, but not all, embodiments are shown. Indeed, various embodiments may be embodied in many different forms and should not be construed as limited to the embodiments set forth herein; rather, these embodiments are provided so that this disclosure will satisfy applicable legal requirements. As used herein, the term "fluid" is not intended to be limited to a liquid. Rather, the term "fluid" is intended to include any material subject to flow, such as, but not limited to, liquids and/or gases (e.g., air, oil, or the like).

The present disclosure provides example pressure sensors and method of manufacturing the same to determine the pressure of a fluid which is isolated from the sensing element. In some examples, pressure sensors are used in various applications including HVAC/R, water pump, air compressor, compressed natural gas (CNG) lines, liquefied petroleum gas (LPG) lines, automotive and transportation fluids, and the like. In many of these example applications, the environment that pressure sensors operate within consist of corrosive media which can affect performance and sometime damage the sensor. Various pressure sensors currently in operation require bigger and more expensive, and/or otherwise unsuitable sensing dies that are not packaged in an effective way to allow for cost effective, media isolating pressure sensors for widespread use.

The pressure sensor described in various embodiments herein may be used in hazardous conditions. In some example embodiments, the pressure sensor described herein includes a processor (e.g., application-specific integrated circuit (ASIC)) and sensing element (e.g., sense die with deep reactive-ion (DRIE) etched technology) that are placed or otherwise housed within a hermetically sealed component compartment of a pressure sensor. In some embodiments, the sensing element is mounted to the processor in a stacked relationship. Alternatively or additionally, the sensing element and processor may be disposed within the hermetically sealed component compartment of a pressure sensor in other arrangements, such as a side-by-side relationship.

Referring now to FIG. 1, an exterior view of a pressure sensor 100 for determining the pressure of a fluid with minimal media interference is provided. In an example embodiment, the pressure sensor 100 exterior may include a header 110, a pressure sensor housing 120, and a protective cap 170. Alternatively or additionally, the pressure sensor may not include a protective cap and instead have an exposed diaphragm 150 (not shown).

In an example embodiment, the pressure sensor housing 120 may have a diaphragm opening at a first end 30 and a header opening at a second end 35. While the diaphragm opening and the header opening may be the same size, in some embodiments, the header opening may be larger than the diaphragm opening in others. In some example embodiments, the pressure sensor housing 120 may be configured with a circular cross-section although other shapes may be contemplated, such as a rectangular cross section, in view of the examples described herein. The pressure sensor housing 120 may be formed from metal or any other suitable material.

The header 110 may likewise be configured with a circular cross-section, in some examples, and may include at least one header pin 105 configured to transmit electrical signals between the interior and the exterior of the pressure sensor 100. In some embodiments, the header 110 may have three or more header pins 105 (e.g., a header may have three header pins). In some embodiments, the header 110 may have as many as eight header pins 105. In some embodiments, three or more header pin seals 50, as shown in FIG. 4B, may be provided in the header 110 to receive the two or more header pins 105. As shown, the header 110 may be engagably fitted with the pressure sensor housing 120 at a second end 35 of the pressure sensor housing.

As shown in various figures, such as FIG. 2, the header 110 may include an exterior header member 15 and an interior header member 10. In some embodiments, the exterior header member 15 and the interior header member 10 are integrally formed to make up header 110. Alternatively, the exterior header member 15 and the interior header member 10 may be attached to one another (e.g., by welding, adhesive, or the like).

In some embodiments, the interior header member 10 may have a cross-sectional diameter that is less than the cross sectional of the exterior header member so as to form or otherwise define a lip 20. As is shown in FIG. 1, the header 110 is sealably engaged with the pressure sensor housing 120 by way of the lip 20 that is welded or otherwise in sealed contact with the mating surface 25 of the pressure sensor housing 120 at the second end 35.

As discussed below, the diaphragm 150 (not shown in FIG. 1) may be attached to or is otherwise integral with the second end 35 of the pressure sensor housing 120. In various embodiments, the diaphragm 150 may be welded to the pressure sensor housing 120. In some embodiments, as shown, the protective cap 170 may be attached at the second end 35 of the pressure sensor housing 120. The protective cap 170, when provided, covers the diaphragm 150 attached at the second end 35 of the pressure sensor housing 120. In various embodiments, and shown in more detail in FIGS. 3 and 4A, the protective cap 170 may define an protective cap opening 175 to allows for the fluid being measured to reach the diaphragm 150.

In an example embodiment, such as shown in FIG. 1, a pressure sensor in accordance with the present disclosure may be configured to determine the pressure of a fluid. Such a pressure sensor may be configured to receive an original pressure of a sealed component compartment from a sensing element. Additionally, the processor 130 may be configured to receive an altered pressure of the sealed component compartment from the sensing element. The processor 130 may be determine the pressure of the fluid based on a comparison between the altered pressure and the original pressure. In such an embodiment, the processor 130 and the sensing element 140 are disposed in the sealed component compartment that is defined by a pressure sensor housing having a diaphragm at a first end of the pressure sensor housing and a header at a second end of the pressure sensor housing. The pressure sensor may also be configured to transmit a signal relating to the determined pressure of the fluid to at least one of three or more header pins.

Referring now to FIG. 2, a schematic cross-sectional view of an illustrative media isolated pressure sensor 100 is provided. In an example embodiment, such as shown in FIG. 2, the pressure sensor 100 may include a header 110, a pressure sensor housing 120, a diaphragm 150, a sensing element 140 (e.g., a sensing die), a processor 130 (e.g., ASIC), a protective cap 170, and/or an O-Ring 160.

As shown in FIG. 2, the pressure sensor housing 120 has the diaphragm 150 sealably attached to the first end 30 of the pressure sensor housing and the header 110 sealably engaged with the second end 35 of the pressure sensor housing.

In some embodiments, the diameter of the header opening at the second end 35 is less than the cross-sectional diameter $D_E$ of the exterior header member 15 and the diameter of the header opening at the second end 35 is greater than the cross-sectional diameter $D_I$ of the interior header member 10. In such examples, the diameter of the header opening at the second end 35 and the cross-sectional diameter $D_I$ of the interior header member 10 may be near identical diameter, such that the interior header member fits flush with the header opening at the second end 35, such as is shown in FIG. 2.

In various embodiments, the pressure sensor 100 may include a processor 130 (e.g., an ASIC) mounted on the header 110, such mounting may be a direct mounting to the interior header member 10 of the header 110 or may be an indirect mounting mounted to the header 110 (e.g., mounted to a ceramic plate, a printed circuit board ("PCB"), or a glass plate that is mounted to the header 110) via adhesive. In some examples, the adhesive may have a sufficient bond line thickness so as to provide, in some examples, insulation resistance.

In example embodiments, the processor may take the form of an ASIC made of silicon and, thus, may include amplification (e.g., an operational amplifier ("op-amp")), analog-to-digital conversion ("ADC"), offset compensation circuitry, erasable programmable read-only memory ("EPROM"), printed circuit board assembly ("PCBA"), and/or other suitable signal conditioning electronics. As discussed in more detail throughout, the processor 130 may receive a signal from a sensing element 140, and condition and/or process the signal for transmission from the pressure sensor 100.

In various embodiments, the pressure sensor 100 may include a sensing element 140, which may take the form of a sensing die that is made of silicon. Specifically, and in some embodiments, the sensing element 140 may be a deep reactive-ion etched (DRIE) sensing die. In some embodiments, the sensing element 140 may include an etched cavity that defines at least part of the pressure sensing diaphragm on a first or back side. In some embodiments, the second or front side of the sensing element 140 may also include one or more bond pads so as to allow for a connection with the processor 130.

In some embodiments, the sensing element 140 may be directly attached on the processor 130 in a stacked relationship, as is shown in FIG. 2. In various embodiments, the attachment of the processor 130 and the sensing element 140 may be made using adhesive or other attachment means. In some examples, the adhesive used to attach or otherwise couple the processor 130 and the sensing element 140 in a stacked relationship is oil compatible and/or is ionically free to avoid any contamination or circuit failure in die. The processor 130 and the sensing element 140 are likewise in data communication by way of wire bonding, bond pads, and/or the like.

In some embodiments, the sensing element 140 may be a micromechanical sensor element fabricated using a silicon wafer and suitable fabrication techniques. The sensing element 140 may have one or more pressure sensing circuitry (e.g., trim circuitry, signal conditioning circuitry, etc.) formed using any suitable fabrication or printing techniques. In some cases, the sensing element 140 may include a pressure sensing diaphragm including one or more sensing components, such as piezoresistive sensing components, formed thereon for sensing a deflection and thus a pressure differential between a top and bottom side of the pressure sensing diaphragm. In some embodiments, the pressure sensing diaphragm may be fabricated by back-side etching a silicon die, however, it is contemplated that any other suitable process may be used, as desired.

When provided, the piezoresistive components may be configured to have an electrical resistance that varies according to an applied mechanical stress (e.g., pressure sensing diaphragm deflection). In some cases, the piezoresistive components may include a silicon piezoresistive material, however, other non-silicon materials may be used. In some cases, the piezoresistive components may be connected in a Wheatstone bridge configuration (full or half bridge). It is to be understood that the piezoresistive components are only one example of a pressure sensing element that can be used, and it is contemplated that any other suitable sensing elements may be used, as desired.

In an example embodiment, the pressure sensor housing 120, the diaphragm 150, and the header 110 together define a component compartment 180 that may be hermetically sealed ("hermetically sealed component compartment"). The hermetically sealed component compartment 180 may be filled with a reference fluid that the pressure sensor may use to determine the fluid pressure of the exterior fluid. For example, the hermetically sealed component compartment 180 may be incompressible oil filled, such as with silicone oil. As is shown in FIG. 2, the sensing element 140 may be attached to the processor 130 in a stacked relationship such that it is placed or otherwise disposed within hermetically sealed component compartment 180.

As is shown in FIG. 2, the processor 130 and the sensing element 140 are stacked together within the hermetically sealed component compartment 180 and, thus, are subjected to the same or substantially similar environmental conditions. In conjunction with the selection of an adhesive, in some examples, the stacked relationship advantageously reduces stress on the sensor and provides improved sensor die performance as the processor 130 and the sensing element 140 have the same or substantially similar coefficient of thermal expansion. Moreover, the processor 130 and the sensing element 140 remain at the same or similar temperature in the hermetically sealed component compartment 180 thereby, in some examples, the need for a temperature measurement by the processor 130 through bridge resistance is reduced or otherwise diminished, in some examples.

In an example embodiment, the processor 130 and the sensing element 140 may be in communication through one or more wires (e.g., bond wires). Moreover, the processor 130 may be connected to at least one of the three or more header pins 105 by three or more wires (e.g., bond wires). In such an embodiment, the processor 130 may transmit and/or receive electrical signals from outside of the hermetically sealed component compartment 180 through the at least one of the three or more header pins 105. For example, the header pin 105 may be in contact with a printed circuit board (PCB) 610, such as the PCB shown in FIG. 12B.

In an example embodiment, the diaphragm 150 may have a first surface 40 and a second surface 45. In some instances, the diaphragm 150 may take the form of a thin, solid material, such as stainless steel, that is configured to provide media isolation between the fluid being measured and the sensing element 140. In an example embodiments, the diaphragm 150 may be attached to the pressure sensor housing 120 at the first end 30 of the pressure sensor housing. The diaphragm 150 may be bonded to the pressure sensor housing 120 using welding, a seal, a gasket, or any other suitable bonding or sealing mechanism (e.g., solder, eutectic, etc.). The diaphragm 150 may be configured such that it deflects based on a difference in pressure between fluid in contact with the first surface 40 of the diaphragm and the second surface 45 of the diaphragm.

In an example embodiment and in operation, a fluid to be measured will be introduced to the first surface 40 of the diaphragm 150 and the difference in pressure between the fluid on the first surface 40 and the fluid in the hermetically sealed component compartment 180 (e.g., the fluid on the second surface 45 of the diaphragm) may cause the diaphragm to deflect in one direction (e.g., if the pressure of the fluid is higher than the component compartment fluid, then the diaphragm 150 may deflect towards the component compartment 180 direction). In such an embodiment, the deflection of the diaphragm 150 causes the pressure of the fluid in the component compartment 180 to change and the altered pressure of the component compartment fluid is measured by the sensing element 140. The measurement by the sensing element 140 is transmitted to the processor 130, where the processor determines the pressure of the fluid to be measured based on the original pressure of the component compartment fluid and the altered pressure of the component compartment fluid.

In an example embodiment, as shown in FIG. 2, the pressure sensor 100 may include an O-Ring 160. In such embodiments, the O-Ring 160 may be positioned around the protective cap 170 of the pressure sensor 100. As shown in FIG. 10, the O-Ring 160 may be positioned in the base plate recess 1050 in order to restrict the fluid to be measured from escaping.

In an example embodiment, the protective cap 170 may be configured to provide a fluid passageway, similar to the fluid inlet 1060 in FIG. 10, that transmits a media (fluid or gas) into an area defined between the protective cap 170 and the diaphragm 150.

As shown in FIG. 3, the diaphragm 150 may be partially covered by a protective cap 170 that is configured or otherwise positioned to protect the diaphragm. In such an embodiment, the protective cap 170 may allow the fluid to reach the diaphragm 150 through the protective cap opening 175 and protect the diaphragm from damage due to large media. In some examples, the protective cap 170 may be used as a support during welding, such as welding the header to the pressure sensor housing.

Referring now to FIGS. 4A and 4B, the exterior view of an example embodiment of a pressure sensor 100 is provided from different angles. Referring to FIG. 4A, the example embodiment has a protective cap 170 attached to the first end 30 of the pressure sensor housing 120. As shown, the diaphragm 150 is partially covered by the protective cap 170. In such embodiments, a portion of the diaphragm 150 is still exposed to the exterior. For example, the protective cap 170 may have at least one opening 175. In some embodiments, the pressure sensor 100 may be positioned to allow the fluid that is being measured to reach the diaphragm through the protective cap opening 175.

Referring now to FIG. 4B, the top view of the pressure sensor 100, in accordance with an example embodiment, is shown. As discussed above, the header 110 may be configured with an exterior header member 15 and an interior header member 10 (not visible in FIG. 4B). As shown in more detail in FIG. 2, in an example embodiment the cross-sectional diameter of the exterior header member 15 may be greater than the cross-sectional diameter of the interior header member 10 thus defining a lip 20. As is shown in FIG. 4B, the lip 20 is sealably engaged with the pressure sensor housing 120. In some embodiments, as discussed above, the header 110 may have three or more header pins 105 (e.g., the header 110 may have three header pins 105, as shown in FIG. 4B). In some embodiments, the header pins 105 may be sealably connected to the header 110.

FIGS. 5, 6A, and 6B illustrate various protection cap 170 configurations that include mounting port arrangements that may be included with an example embodiment of a pressure sensor in accordance with the present disclosure. Referring now to FIG. 5 and in an example embodiment, the protective cap may have a threaded exterior attached by suitable joining method (e.g., welding). For example, the pressure sensor 100 may be mounted in a position by screwing the pressure sensor into place. Additionally, as shown, the protective cap opening 175 may a plurality of different cross-sectional areas.

Referring now to FIG. 6A and in some embodiments, the protective cap 170 may be shaped in accordance with the intended purpose of the pressure sensor 100. For example, the pressure sensor 100 may be configured to have the protective cap 170 be a certain size and/or shape to allow for a snug fit with a mounting bracket or other mounting arrangement (e.g., mounting arrangements in FIGS. 10 and 11). For example, the protective cap 170 may have a conical shape (e.g., FIG. 6A) that is configured to be inserted into a base plate recess 1050 that is shaped to receive a conical shape, such that the protective cap 170 may fit snuggly to avoid fluid escaping. In an example embodiment, the size of the protective cap opening 175 may be based on the size of potential media in the fluid being measured. For example, in an HVAC application, the protective cap opening 175 may be sized to prevent larger debris that may be in the HVAC system from reaching the diaphragm.

Referring now to FIG. 6B and in some example embodiments, an O-Ring 160 may be used in conjunction with the protective cap 170. In an example embodiment, the protective cap 170 may be configured with an O-Ring cutout 165, such as the one shown in FIG. 6B.

As discussed in more detail in relation to FIGS. 10 and 11 and as shown in FIGS. 6A and 6B some embodiments, the header 110 may include the three or more header pins 105 connected to a support plate 600. In some embodiments, as discussed in reference to FIGS. 12A and 12B below, the support plate 600 may include various pressure sensors 100, a printed circuit board 610, and bushings 620.

FIGS. 7A, 7B, 8, and 9 are three example embodiments of the configuration of the attachments of the processor 130 and the sensing element 140 to the header 110. Referring now to FIG. 7A and in an example embodiment, the sensing element 140 may be attached directly to the processor 130 and the processor is attached to the interior header member 10 of the header 110. The sensing element 140 may be attached to the processor 130 in a stacked relationship, such as is described with respect to FIG. 2. As shown in FIG. 7B, the processor 130 and the sensing element 140 may be connected to one another through bond wires. Additionally, the processor 130 may be connected to the three or more header pins 105 through bond wires.

Referring now to FIG. 8, an example embodiment of a pressure sensor in accordance with the present disclosure is provided. In an example embodiment, a ceramic plate 1300 may be provided that is attached to the interior header member 10 of the header 110. In this example embodiment, the ceramic plate 1300 provides a surface for the processor 130 and/or the sensing element 140 to be attached. In some embodiments, a PCB or glass plate may be used in place of the ceramic plate 1300, such that the PCB or glass plate is attached to the interior header member 10 of the header 110 and provides a surface for the processor 130 and/or the sensing element 140 to be attached.

In some embodiments, such as shown in FIG. 8, the processor 130 and the sensing element 140 may be separately attached to the ceramic plate 1300 using adhesive. The adhesive used for the processor 130 and/or the sensing element 140, in some examples, may be oil compatible and/or ionically free.

Referring now to FIG. 9, an example embodiment of a pressure sensor 100 in accordance with the present disclosure is provided. In an example embodiment, the processor 130 and the sensing element 140 may be attached directly to the interior header member 10 of the header 110. In some embodiments, such as shown in FIG. 9, the processor 130 and the sensing element 140 may be separately attached to the header 110 using adhesive. The adhesive used for the processor 130 and/or the sensing element 140, in some examples, may be oil compatible and/or ionically free.

FIGS. 10 and 11 are example pressure sensor mounting configurations according to example embodiments of the present disclosure. Referring now to FIG. 10, a singular pressure sensor 100 is fixedly disposed between a sensor mounting base plate ("base plate") 1000 and a sensor mounting top plate ("top plate") 1005. In an example embodiment, the top plate 1005 may be removably attached the base plate 1000.

The application of the pressure sensor may determine the level of attachment in some examples. In some embodiments, various attachment methods may be used for the top plate 1005 and base plate 1000, such as screws, adhesive, welding, and the like. The type of attachment may be based on the expected access needed for the pressure sensor 100. For example, a top plate 1005 may be screwed to the base plate 1000 such that the top plate may be removed quickly to access or replace the pressure sensor 100. In some embodiments, the top plate 1005 may be screwed by one or more screws to the base plate 1000. For example, as shown in FIG. 10, the top plate 1005 may be attached to the base plate 1000 with two screws on each side of the pressure sensor 100.

In some embodiments, the base plate 1000 may have a pressure sensor recess 1050 defined to allow at least a portion of the pressure sensor 100 to be positioned. For example, as shown in FIG. 10, a portion of the first end 30 of the pressure sensor housing 120 and the protective cap 170 may rest in the pressure sensor recess 1050. In an example embodiment, the base plate 1000 allows for an amount of fluid to reach the pressure sensor 100 through a base plate fluid inlet 1060. The base plate fluid inlet 1060 may act in place of, or in addition to, the protective cap opening 175. Alternatively or additionally the pressure sensor 100 may have a protective cap 170 and the fluid inlet 1060 may be used to partially cover the diaphragm 150 of the pressure sensor 100.

In an example embodiment, the top plate 1005 may engage with the pressure sensor housing 120 to hold the pressure sensor 100 in place. In some embodiments, the top plate 1005 may define a pressure sensor cutout 1070 that is larger than the portion of the pressure sensor 100 that is not positioned in the pressure sensor recess 1050 of the base plate 1000. For example, the pressure sensor cutout 1070 may have the same cross-sectional shape as the pressure sensor (e.g., circular) and have a diameter greater than the second end 35 of the pressure sensor housing 120. In some embodiments, the pressure sensor cutout 1070 may have a smaller cross-sectional diameter than the first end 30 of the pressure sensor, as shown, such that the pressure sensor cutout 1070 of the top plate 1005 engages with the pressure sensor housing 120 and prevents vertical movement. In an example embodiment, the overhang of the pressure sensor cutout 1070 may extend around the entire pressure sensor housing 120, as shown. The top plate 1005 may be a thickness that allows the support plate 600 to be placed in contact with the header pins 105, such as shown in FIG. 11.

Referring now to FIG. 11, another example pressure sensor mounting configuration is provided as in FIG. 10. In an example embodiment, the base plate 1000 may have a plurality of pressure sensor recesses 1050 and the top plate 1005 has a plurality of pressure sensor cutouts 1070. Similar to FIG. 10, the embodiment of FIG. 11 comprises individual pressure sensor recess 1050, pressure sensor 100, and processor sensor cutout 1070.

In some embodiments, one or more of the pressure sensors 100 may determine the pressure of the same or different fluids. For example, there may be multiple different fluid pressures that are monitored in a system and the fluid inlets 1060 may be configured to allow multiple different compartments that have different fluids to be measured (e.g., a pressure sensor may determine the pressure of water in an engine and another pressure sensor may determine the pressure of oil in the same engine).

In some embodiments, two or more pressure sensors may determine the pressure of the same fluid. For example, there may be some pressures that are critical, in some examples, for operation and therefore a redundant pressure sensor may be implemented to reduce the possibility of inaccurate pressure readings. In such a case, some of the fluid inlets 1060 for each of the two or more pressure sensors 100 may be connected to the same reservoir. In some embodiments, as shown in FIG. 11, the pressure sensors 100 may be connected to the same support plate 600 and PCB 610, as discussed in more detail in relation to FIGS. 12A, 12B, and 13.

FIGS. 12A and 12B provide different views of a support plate 600 with a PCB 610 configured to be in communication with one or more pressure sensors in accordance with an example embodiment of the present disclosure. In some embodiments, the processor may transmit and/or receive electrical signals to and/or from the PCB through the header pins 105. As shown in FIG. 13, in some embodiments, multiple pressure sensors or non-pressure sensors (e.g., a pressure switch, temperature sensor and/or the like) may be connected to a microcontroller through a BUS or other data connection. For example, the sensors 100 may be connected to the pressure sensor 100 using various communication buses, such as an Inter-Integrated Circuit ("I2C") BUS protocol, serial peripheral interface protocol, pulse width modulation ("PMW"), controller area network ("CAN"), voltage controlled, and/or the like. The microcontroller 1310 may receive and/or transmit electrical signals to and/or from the output BUS 1320 and the sensor BUS 1330.

Referring now to FIG. 14, a method of manufacturing a pressure sensor in accordance with an example embodiment of the present disclosure is provided. Referring now to Block 1400 of FIG. 14, the method of manufacture may include disposing a sensing element 140 on a header 110. As discussed above, the sensing element 140 may, in various embodiments, be attached directly to the processor 130, ceramic plate 1300, PCB, or the interior header member 10 of the header 110. In some embodiments, the sensing element 140 may be attached to one of the above using adhesive, soldering, or the like.

Referring now to Block 1410 of FIG. 14, the method of manufacture may include disposing a processor 130 on the header 110. As discussed above, the processor 130 may, in various embodiments, be attached directly to the ceramic plate 1300 or the interior header member 10 of the header 110. In some embodiments, the processor 130 may be attached using the same method as the sensing element is attached (e.g., adhesive, welding, or the like). In some embodiments, the method of manufacture may also include attached a protective cap to a first end 30 of the pressure sensor housing. In various embodiments, the protective cap may be attached to the pressure sensor housing 120 using adhesive, welding, or the like.

Referring to Block 1420 of FIG. 14, the method of manufacture may include attaching a diaphragm 150 to a pressure sensor housing 120 at a first end 30 of the pressure sensor housing, the diaphragm configured to be in contact on a first surface with hermetically sealed compartment 180 and on a second surface with the fluid to be measured.

Referring now to Block 1430 of FIG. 14, the method of manufacture may include engaging a lip 20 of the header 110 with a second end 35 of the pressure sensor housing 120 to form a hermetically sealed component compartment 180. In various embodiments, the order of the diaphragm 150 and the header 110 being attached to the pressure sensor housing 120 may vary. For example, the header 110 may be attached to the pressure sensor housing 120 before the diaphragm 150 is attached or vice versa. In an example embodiment, the lip 20 of the header 110 may be attached to the mating surface of the second end 35 of the pressure sensor housing 120 using adhesive, welding, or the like. In various embodiments, the hermetically sealed component compartment 180 may be filled with a fluid, such as oil.

Referring now to FIG. 15, a method of manufacturing a pressure sensor in accordance with an example embodiment of the present disclosure is provided. Referring now to Block 1500 of FIG. 15, the method of manufacturing may include disposing a ceramic plate or PCB on a header 110. As discussed throughout a ceramic plate or PCB may be used to provide a surface to mount the processor 130 and/or sense die 140.

Referring now to Block 1510 of FIG. 15, the method of manufacturing may include disposing a processor 130 and a sense die (e.g., or other type of sensing element 140) on the ceramic plate 1300 or PCB attached to the header 110. In some embodiments, as shown and discussed in reference to FIG. 8, the processor 130 and the sense die 140 may be mounted on the ceramic plate or PCB and in communication with one another through bond wires.

Referring now to Block 1520 of FIG. 15, the method of manufacturing may include electrically connecting processor 130 to the sense die 140 and three or more header pins 105. In various embodiments, the processor may be configured to receive and transmit signals to and from the header pins, as well as the sense die. The electrical connections may be accomplished or otherwise connected through bond wires or the like.

Referring now to Block 1530 of FIG. 15, the method of manufacturing may include attaching a diaphragm 150 to the pressure sensor housing 120 at a first end 30 of the pressure sensor housing. As shown in at least FIG. 2, the diaphragm 150 may be positioned to receive the fluid to be measured on a first surface 40 and the fluid within the component compartment 180 on a second surface 45. As such, the diaphragm 150 is configured to act as a barrier between the fluid to be measured and the sense die 140.

Referring now to Block 1540 of FIG. 15, the method of manufacturing may include filling the component compartment with a liquid. In some embodiments, the liquid may be an incompressible oil. Referring now to Block 1550 of FIG. 15, the method of manufacturing may include engaging a lip 20 of a header 110 with a second end 35 of the pressure sensor housing. In various embodiments, Blocks 1530 and 1550 may be switched. After both the diaphragm 150 and the header 110 are in place, a hermetically sealed component compartment is created that protects the processor 130 and sense die 140 from the fluid to be measured.

In some embodiments, certain ones of the operations, shown in FIGS. 14 and 15 discussed above, may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A pressure sensor for determining a pressure of a fluid, the pressure sensor comprising:
   a pressure sensor housing sealably attached to a diaphragm at a first end of the pressure sensor housing;
   a header at a second end of the pressure sensor housing the header with a lip configured to engageably fit with the second end of the pressure sensor housing to create a hermetically sealed component compartment within the pressure sensor housing, wherein the header includes three or more header pins configured to transmit an electrical signal between an interior and an exterior of the hermetically sealed component compartment, wherein the diaphragm is positioned outside of the hermetically sealed component compartment;
   a processor disposed within the hermetically sealed component compartment and in electrical communication with the three or more header pins; and
   a sensing element coupled to the processor and disposed within the hermetically sealed component compartment, wherein the sensing element is in electrical communication with the processor.

2. The pressure sensor of claim 1, wherein the sensing element is in a stacked relationship with respect to the processor.

3. The pressure sensor of claim 1, wherein the hermetically sealed component compartment is filled with a liquid.

4. The pressure sensor of claim 1, wherein the diaphragm is configured to be in contact on a first surface with the hermetically sealed component compartment and on a second surface with the fluid to be measured.

5. The pressure sensor of claim 1, wherein the processor is mounted directly to the header.

6. The pressure sensor of claim 1 further comprising a ceramic plate or a printed circuit board directly mounted to the header, wherein the processor is directly mounted to the ceramic plate or the printed circuit board.

7. The pressure sensor of claim 1 further comprising a protective cap configured to be attached to the first end of the pressure sensor, wherein the protective cap has at least one opening allowing the fluid to reach the diaphragm.

8. The pressure sensor of claim 1, wherein the diaphragm is configured to deflect in one direction or another based on a difference in pressure between the hermetically sealed component compartment and the fluid to be measured, wherein the deflection of the diaphragm alters an original pressure of the hermetically sealed component compartment,
   wherein the sensing element is configured to measure the altered pressure of the hermetically sealed component compartment based on the deflection of the diaphragm, and
   wherein the processor having computer coded instructions therein, with the computer instructions configured to, when executed, cause the pressure sensor to determine the pressure of the fluid based on the altered pressure measured by the sensing element and the original pressure.

9. The pressure sensor of claim 1, wherein the sensing element and the processor have a substantially similar coefficient of thermal expansion.

10. A pressure sensor for determining a pressure of a fluid, the pressure sensor comprising:
    a housing, the housing having a diaphragm fixedly attached at a first end and having a second end, wherein the second end has a mating surface that defines a recess, wherein the housing defines a component compartment;
    a header comprising an exterior header member having a first cross-sectional diameter and interior header member having a second cross-sectional diameter, wherein the interior header member is sized to be inserted into the recess and the exterior header member is sized to mate with the mating surface such that the header hermetically seals the component compartment, wherein the diaphragm is positioned outside of the hermetically sealed component compartment;
    a sensing element disposed within the component compartment; and
    a processor disposed within the component compartment.

11. The pressure sensor of claim 10, wherein the diaphragm and the header sealably enclose the component compartment to create a hermetically sealed component compartment.

12. The pressure sensor of claim 11, wherein the diaphragm is configured to deflect in one direction or another based on a difference in pressure between the hermetically sealed component compartment and the fluid to be measured, wherein the deflection of the diaphragm alters an original pressure of the sealed component compartment,
    wherein the sensing element is configured to measure the altered pressure of the hermetically sealed component compartment based on the deflection of the diaphragm, and
    wherein the processor having computer coded instructions therein, with the computer instructions configured to, when executed, cause the pressure sensor to determine the pressure of the fluid based on the altered pressure measured by the sensing element and the original pressure.

13. The pressure sensor of claim 10, wherein the sensing element is mounted
    directly to the processor and the processor is mounted directly to the interior header member of the header.

14. The pressure sensor of claim 10, wherein the processor and the sensing element are mounted directly to the interior header member of the header.

15. The pressure sensor of claim 10 further comprising a ceramic plate or a printed circuit board directly mounted to the interior header member of the header, wherein the sensing element and the processor are mounted directly to the ceramic plate or printed circuit board.

16. The pressure sensor of claim 10 further comprising a ceramic plate directly mounted to the interior header member of the header, wherein the sensing element is mounted directly to the processor and the processor is mounted directly to the ceramic plate.

17. The pressure sensor of claim 10 further comprising a protective cap configured to be attached to the first end of the pressure sensor, wherein the protective cap has at least one opening allowing the fluid to reach the diaphragm.

18. The pressure sensor of claim 10, wherein the sensing element and the processor have a substantially similar coefficient of thermal expansion.

19. The pressure sensor of claim 10, wherein the header includes three or more header pins configured to transmit an electrical signal between an interior and an exterior of the component compartment, and the processor is in communication with at least one of the three or more header pins.

20. A method of determining the pressure of a fluid, the method comprising:
receiving an original pressure of a sealed component compartment from a sensing element;
receiving an altered pressure of the sealed component compartment from the sensing element;
determining, via a processor, the pressure of the fluid based on a comparison between the altered pressure and the original pressure, wherein the processor and the sensing element are disposed in the sealed component compartment that is defined by a pressure sensor housing having a diaphragm at a first end of the pressure sensor housing positioned outside of the sealed component compartment and a header at a second end of the pressure sensor housing; and
transmitting a signal relating to the determined pressure of the fluid to at least one of three or more header pins.

* * * * *